United States Patent
Basilier et al.

(10) Patent No.: US 9,942,159 B2
(45) Date of Patent: Apr. 10, 2018

(54) METHOD AND ARRANGEMENT FOR QOS DIFFERENTIATION OF VPN TRAFFIC ACROSS DOMAINS

(71) Applicant: TELEFONAKTIEBOLAGET L M ERICSSON (PUBL), Stockholm (SE)

(72) Inventors: Henrik Basilier, Täby (SE); Göran Eneroth, Tyresö (SE); Michael Liljenstam, Cupertino, CA (US); Linus Andersson, Göteborg (SE); Björn Bodén, Sunne (SE); Kyösti Toivanen, Kirkkonummi (FI)

(73) Assignee: TELEFONAKTIEBOLAGET LM ERICSSON, Stockholm (SE)

(*) Notice: Subject to any disclaimer, the term of this patent is extended or adjusted under 35 U.S.C. 154(b) by 259 days.

(21) Appl. No.: 14/764,225

(22) PCT Filed: Jan. 28, 2014

(86) PCT No.: PCT/EP2014/051627
§ 371 (c)(1),
(2) Date: Jul. 29, 2015

(87) PCT Pub. No.: WO2014/118174
PCT Pub. Date: Aug. 7, 2014

(65) Prior Publication Data
US 2015/0372928 A1    Dec. 24, 2015

Related U.S. Application Data

(60) Provisional application No. 61/757,841, filed on Jan. 29, 2013.

(51) Int. Cl.
*H04L 12/851* (2013.01)
*H04L 12/46* (2006.01)
*H04L 29/06* (2006.01)

(52) U.S. Cl.
CPC ......... *H04L 47/24* (2013.01); *H04L 12/4633* (2013.01); *H04L 12/4641* (2013.01); *H04L 69/22* (2013.01)

(58) Field of Classification Search
CPC . H04L 47/2441; H04L 47/2408; H04L 47/20; H04L 12/4641; H04L 63/0272;
(Continued)

(56) References Cited

U.S. PATENT DOCUMENTS 8,370,921 B2 * 2/2013 Duan .................. H04L 12/4633
713/160
9,614,774 B2 4/2017 Basilier
(Continued)

FOREIGN PATENT DOCUMENTS

JP   2003244215 A   8/2003
JP   2004274666 A   9/2004
(Continued)

*Primary Examiner* — Curtis A Alia

(57) ABSTRACT

A node in a first network domain and a method performed thereby for transmitting a data packet to a VPN client in a second network domain, the node and the VPN client being part of a VPN, wherein the first and second network domain are connected by means of a third network domain are provided. The method comprises receiving, from an application server, a first packet comprising a first IP header and a payload; and determining a DCSP. The method further comprises adding a second header comprising the determined DCSP and an IP address of a VPN client resulting in a second packet and encrypting the second packet. Further the method comprises adding a third header to the encrypted second packet resulting in a third packet, the third header comprising a destination address of a node in the second network domain, and transmitting the third packet in an IP tunnel terminating at the node in the second network domain.

16 Claims, 8 Drawing Sheets

(58) Field of Classification Search
CPC ..... H04L 47/825; H04L 65/80; H04L 45/302; H04L 12/4633
See application file for complete search history.

(56) References Cited

U.S. PATENT DOCUMENTS

| | | | |
|---|---|---|---|
| 2005/0088977 A1* | 4/2005 | Roch | H04L 12/4641 370/254 |
| 2005/0265397 A1 | 12/2005 | Chapman | |
| 2006/0072573 A1 | 4/2006 | Broberg | |
| 2010/0172306 A1* | 7/2010 | Gill | H04L 47/10 370/329 |
| 2011/0023090 A1 | 1/2011 | Asati et al. | |

FOREIGN PATENT DOCUMENTS

| | | | |
|---|---|---|---|
| JP | 2004529546 A | 9/2004 | |
| JP | 2005260594 A | 9/2005 | |
| JP | 2011505761 A | 2/2011 | |
| WO | 2006038268 A | 10/2004 | |
| WO | 2007/051300 A1 | 5/2007 | |

* cited by examiner

METHOD AND ARRANGEMENT FOR QOS DIFFERENTIATION OF VPN TRAFFIC ACROSS DOMAINS

This application is a 371 of PCT/EP2014/051627, filed Jan. 28, 2014, which claims the benefit of U.S. Provisional Application No. 61/757,841, filed Jan. 29, 2013, the disclosure of which is fully incorporated herein by reference.

TECHNICAL FIELD

The present disclosure relates to Virtual Private Network, VPN, traffic and in particular to differentiation of VPN traffic with regard to Quality of Service, QoS, across domains.

BACKGROUND

VPN is a technology used in order to establish secure connections, so called tunnels, between two points, or terminals, over an insecure data communication network. VPN may also be used to extend a private network and the resources contained in the network across public networks like the Internet. It enables a host computer to send and receive data across shared or public networks as if it were a private network with all the functionality, security and management policies of the private network. Again, tunnels or virtual point-to-point connections are established by means of which the host computer is enabled to send and receive data across shared or public networks.

However, packets being transmitted by means of a VPN may still suffer from information in the header of the packet being corrupted, which may affect the delivery of the packet to its final destination. With the header being corrupted is meant that the DSCP value in the header may have been altered or removed during its travel from a sender to a receiver.

SUMMARY

The object is to obviate at least some of the problems outlined above. In particular, it is an object to provide a node in a first network domain and a method performed by the node in the first network domain for transmitting a data packet to a VPN client in a second network domain, wherein the node and the VPN client are part of a VPN, wherein the first network domain and second network domain are connected by means of a third network domain. These objects and others may be obtained by providing a node in a first network domain and a method performed by a node in a first network domain according to the independent claims attached below.

According to an aspect a method performed by a node in a first network domain for transmitting a data packet to a VPN client in a second network domain, wherein the node and the VPN client are part of a VPN, wherein the first network domain and second network domain are connected by means of a third network domain is provided. The method comprises receiving, from an application server, a first packet comprising a first IP header and a payload; and determining a DCSP. The method further comprises adding a second header comprising the determined DCSP and an IP address of a VPN client resulting in a second packet and encrypting the second packet. Further the method comprises adding a third header to the encrypted second packet resulting in a third packet, wherein the third header comprises a destination address of a node in the second network domain, and transmitting the third packet in an IP tunnel terminating at the node in the second network domain.

According to an aspect, a node in a first network domain for transmitting a data packet to a VPN client in a second network domain, wherein the node and the VPN client are part of a VPN, wherein the first network domain and second network domain are connected by means of a third network domain is provided. The node in the first network domain comprises a receiving unit adapted for receiving, from an application server, a first packet comprising a first IP header and a payload; and a determining unit adapted for determining a DCSP. The node further comprises an adding unit adapted for adding a second header comprising the determined DCSP resulting in a second packet; an encrypting unit adapted for encrypting the packet, wherein the adding unit further is adapted for adding a third header to the encrypted second packet resulting in a third packet. The node further comprises a transmitting unit adapted for transmitting the third packet in an IP tunnel terminating at the node in the second network domain.

According to an aspect, a node in a first network domain adapted for transmitting a data packet to a VPN client in a second network domain, wherein the node and the VPN client are part of a VPN, wherein the first network domain and second network domain are connected by means of a third network domain is provided. The node comprises a processor and a memory, the memory comprising instructions which when executed by the processor causes the node to receive, from an application server, a first packet comprising a first IP header and a payload; to determine a DCSP; and to add a second header comprising the determined DCSP resulting in a second packet. Further, the instructions in the memory when executed by the processor causes the node to encrypt the second packet; to add a third header to the encrypted second packet resulting in a third packet, wherein the third header comprises a destination address of a node in the second network domain; and to transmit the third packet in an IP tunnel terminating at the node in the second network domain.

According to an aspect, a computer program, comprising computer readable code means, which when run in a processing unit comprised in an arrangement in a node as described above causes the node to perform the corresponding method as described above.

The node and the method performed by the node in the first network domain for transmitting the data packet to the VPN client in a second network domain may have several advantages. have several possible advantages. The method and the node do not impact on the VPN client, thus no updates or modification of the VPN client is required. The method and the node have limited or no impact on the VPN gateway.

BRIEF DESCRIPTION OF DRAWINGS

Embodiments will now be described in more detail in relation to the accompanying drawings, in which.

DETAILED DESCRIPTION

In a VPN, it may be desirable to employ different prioritisation rules for different VPN traffic depending on e.g. QoS associated with the VPN traffic.

One example of a way to realise differentiation of VPN traffic across domains is to map QoS tags, e.g. Differentiated Services Code Points, DSCPs, of a first/inner Internet Protocol, IP, header of a packet to be transmitted via an IP tunnel to a second/outer IP header of the packet. When a packet from an application server is to be transmitted over the VPN to a VPN client, the packet to be transmitted has a first/inner header comprising e.g. address information of the receiver of the packet. The first/inner header may also comprise a DSCP indicating the QoS of the packet. The DCSP will "tell" or provide information to any node or router receiving the packet during its transportation from the sender to the receiver how to e.g. prioritise the packet over other packets that may be received. When the packet is transmitted over, or by means of, the VPN, the packet will get a second/outer header added to it, into which the DSCP value may be copied from the first/inner header.

Another option to perform packet inspection, e.g. 5-tuple, and based on the packet inspection, set the QoS (e.g. DSCP) of the second/outer IP header.

A possible disadvantage of QoS tagging, i.e. inserting e.g. the DSCP into the second/outer IP header is that it may not be guaranteed to travel unchanged across domains (or even within a domain).

In order to safeguard that, or at least increase the possibility of, the packet travelling across domains without the QoS tagging being unchanged, certain measures may be taken as will be described in more detail below in relation to the accompanying drawings.

Briefly described, a node in a first network domain and a method performed by the node for transmitting a data packet to a VPN client in a second network domain are provided. The node and the VPN client are part of a VPN, wherein the first network domain and second network domain are connected by means of a third network domain.

Figure 1A:
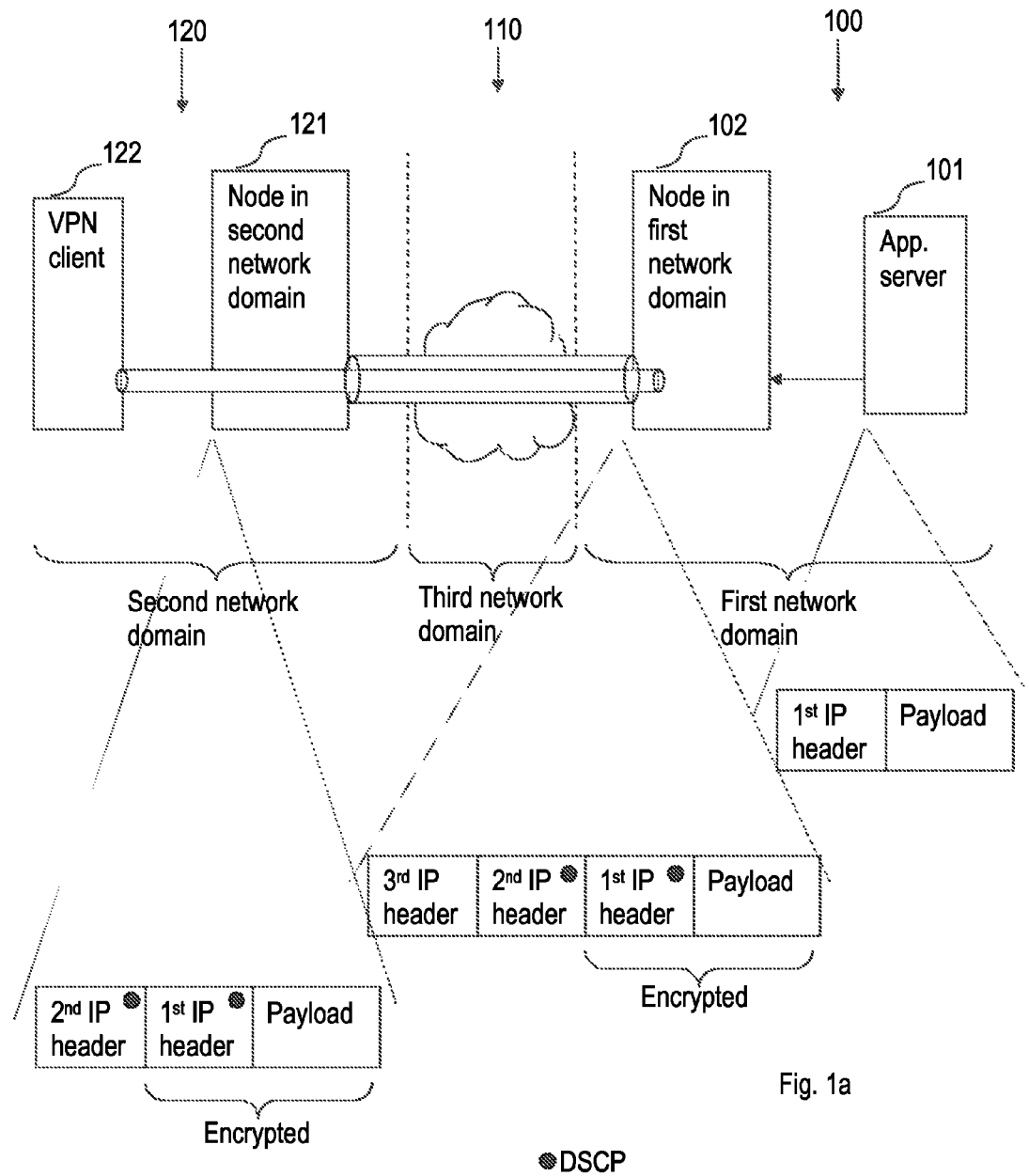
FIG. 1a is a schematic illustration of a node in a first network domain communicating with a node in a second network domain across a third network domain via a VPN according to an example.

FIG. 1a is a schematic illustration of a node 102 in a first network domain 100 communicating with a VPN client 122 in a second network domain 120 across a third network domain 110 according to an example. In this example, an application server 101 in the first network domain 100 sends a data packet in downlink to an application client (not shown) via a node 102 in the first network domain 100 and the VPN client 122 in a second network domain 120 via, or by means of, a VPN. The application server 101 in the first network domain 100 may not be aware of the VPN, only that the packet is to be sent to a receiver (application client) having an address, e.g. an IP address. Alternatively, the application server 101 in the first network domain 100 may determine that the packet shall be sent to the receiver via, or by means of, the VPN. The application server 101 and the application client are part of, or connected to, the VPN. The VPN is illustrated in FIG. 1a by the longer horizontal elongated cylinder between the VPN client 122 in the second network 120 and the node 102 in the first network 100. Even if the horizontal elongated cylinder is illustrated as terminating in the node 102 in the first network domain 100, the application server 101 of the first network domain 100 is still part of, or connected to, the VPN. It shall be pointed out that FIG. 1a is merely a schematic illustration. For example, to "the left of", or after, the VPN client 122, an application client receives the packet from the application server, which will be explained in more detail with reference to FIG. 1d. By means of the VPN, the application server and the application are part of the same addressing domain, even though they are located in different network domains. The VPN tunnels can be said to either be part of the VPN or facilitate the VPN.

In FIG. 1a, the application server 101 sends a packet, destined for the application client (not shown), to the node 102 in the first network domain. The packet has a payload and a first IP header, or an inner IP header. The first IP header may optionally comprise DSCP, even though the packet in FIG. 1a is illustrated as not comprising DSCP. The first/inner IP header comprises a destination address, i.e. the address of the application client, which was inserted into the first/inner header of the first packet by the application server 101 in the first network domain 100. The packet is received by the node 102 in the first network domain. The node 102 in the first network domain 100 may determine a DSCP and insert it into a second IP header which is added to the received packet. The node 102 in the first network domain 100 may further insert an IP address of the VPN client 122 in the second network domain 120. The original packet, comprising the payload and first IP header, together with the added second IP header can be said to constitute a second packet. As described above, the application server 101 in the first network domain 100 may not even be aware of the VPN and the node 102 in the first network domain 100 may determine that the packet is to be sent to the receiver (the application client) via, or by means of, the VPN. The VPN between the the node 102 in the first network domain 100 and the VPN client 122 in the second network domain 120 may already exist. If the packet is to be sent directly to the application client, then the node 102 in the first network domain 100 may simply forward the packet to the destination address outside of the outer tunnel (the shorter fatter elongated cylinder in FIG. 1a), which will be explained in more detail below, with reference to FIG. 1c. It shall be pointed out that if the packet is forwarded to the destination address in this manner, the packet is transmitted outside the outer tunnel (the third IP header will not be added), i.e. it is transmitted in the thinner elongated cylinder (the second IP header will be added), which is then not encompassed by the shorter fatter cylinder of FIG. 1a (since the third IP header is not added). However, if the node 102 in the first network domain 100 determines that the packet shall be sent by means of, or via, the VPN, then the node 102 in the first network domain 100 will add the second IP header to the packet. The determination may be made by the node 102 in the first network domain 100 by e.g. inspecting the packet and determining that the packet is to be sent to the receiver (the application client) via, or by means of, the VPN, and the VPN client, based on the result of the packet inspection. Alternatively, the node 102 in the first network domain 100 may determine that the packet is to be sent to the receiver (the application client) via, or by means of, the VPN based on the application server from which the node 102 in the first network domain 100 received the packet.

The node 102 in the first network domain may then encrypt the second packet, or the payload of the second packet comprising the payload of the first packet and the first IP header. The second IP header of the second packet is thus not encrypted. This is also illustrated in the figures.

The node 102 in the first network domain 100 may then add a third IP header to the encrypted second packet resulting in a third packet. In FIG. 1a, this third packet is illustrated with a payload, the first IP header comprising DSCP, the second IP header comprising DSCP and the third IP header not comprising DSCP. However, even though the third IP header is illustrated not comprising the DSCP, the node 102 in the first network domain 100 may insert the DSCP even in the third IP header. In case the first IP header does not comprise a DSCP when received by the node 102 in the first network domain 100, the node 102 in the first network domain 100 may insert the determined DSCP also into the first IP header. FIG. 1a also illustrates the first IP header and the payload being encrypted, whereas the second and the third IP header are not encrypted. The third IP header comprises a destination address of a node 121 in the second network domain 120.

In case an IP tunnel is not already created between the node 102 in the first network domain 100 and the node 121 in the second network domain 120, the node 102 in the first network domain 100 creates such an IP tunnel. This IP tunnel is illustrated in FIG. 1a as the shorter elongated horizontal cylinder between the two nodes 102 and 121, which tunnel also encompasses the longer horizontal elongated cylinder between the VPN client 122 in the second network 120 and the node 102 in the first network.

The node 102 in the first network domain 100 may then transmit the third packet in the IP tunnel terminating at the node 121 in the second network domain 120.

It shall again be pointed out that FIG. 1a is schematic. Even though the longer horizontal elongated cylinder between the VPN client 122 in the second network 120 and the node 102 in the first network 100 is illustrated as terminating more or less inside the VPN client 122 in the second network domain 120 and the node 102 in the first network domain 100, the "end points" of the IP tunnel may just as well be outside of the respective node 102 and VPN client 122, e.g. in (or at) a respective router (or the like) connected to the node 102 and the VPN client 122 respectively. The same observation is relevant for the shorter horizontal elongated cylinder between the node 102 in the first network 100 and the node 121 in the second network domain 120.

At the node 121 in the second network domain 120, the third IP header is removed, since the node 121 in the second network domain 120 was the destination address comprised in the third IP header. The remaining packet comprising the second IP header and the encrypted first IP header and the payload is then transmitted, or forwarded, towards the VPN client 122. This is since the destination address comprised in the second IP header is the address of the VPN client 122. The second network domain may comprise other nodes and/or entities which are not illustrated in FIG. 1a. An example will be described below in relation to FIG. 1d.

The IP tunnel between the node 102 in the first network domain 100 and the node 121 in the second network domain 120 may be established or created by means of Generic Routing Encapsulating, GRE, IP-in-IP or Multi Protocol Label Switch, MPLS. However, there may be other means to create the IP tunnel and the GRE, the IP-in-IP and the MPLS are merely examples of suitable protocols.

In an example, the node 102 in the first network 100 is a VPN Gateway, VPN-GW, or a VPN server.

Figure 1B:
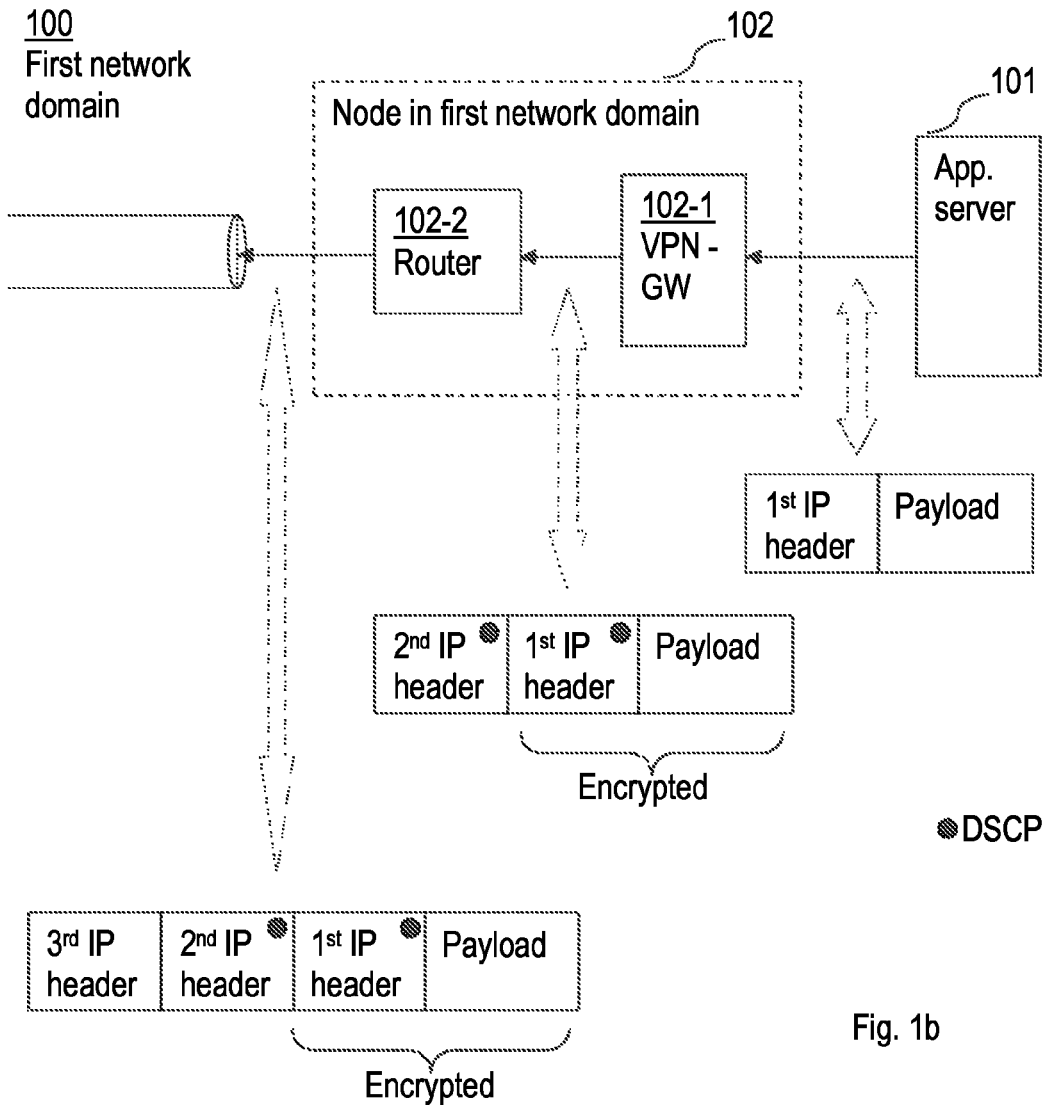
FIG. 1b is a schematic illustration of the node in the first network domain communicating with the node in the second network domain across the third network domain via a VPN according to an example.

FIG. 1b is a schematic illustration of the node 102 in the first network domain 100 communicating with the node in the second network domain across the third network domain according to an example.

FIG. 1b illustrates the node 102 in the first network domain 100 comprising a VPN-GW 102-1 and a router 102-2. It shall be pointed out that this is merely an example of illustrating the process of adding different headers to a received IP packet destined for the VPN client 122 in the second network domain 120. The node 102 in the first network domain 100 may comprise other entities, more entities, less entities capable of performing the same actions. Further, in FIG. 1b the IP tunnel, i.e. the shorter horizontal elongated cylinder between the node 102 in the first network 100 and the node 121 in the second network domain 120 in FIG. 1a, is illustrated in FIG. 1b to have an "end point" outside the node 102 in the first network domain 100. The end point of the IP tunnel may end in (or at) the node 102 in the first network domain 100 or in (or at) a router/GW (not shown) connected to the node 102 in the first network domain 100.

FIG. 1b illustrates the application server 101 in the first network domain 100 sending or transmitting a packet to the node 102 in the first network domain 100. The packet is destined for the application client 122 in the second network domain 120.

The packet has a payload and a first IP header, or an inner IP header. The first IP header may optionally comprise DSCP, even if the packet in FIG. 1b is illustrated as not comprising DSCP. The first/inner IP header comprises a destination address, i.e. the address of the application client 122. The packet is received by the node 102 in the first network domain. The node 102 in the first network domain may determine a DSCP and insert it into a second IP header which is added to the received packet. The IP address of the VPN client 122 of the second network domain 120 is also inserted into the second IP header. The original packet, comprising the payload and first IP header, together with the added second IP header can be said to constitute a second packet. In FIG. 1b, this is illustrated as being performed by the VPN-GW 102-1.

The node 102 in the first network domain may then encrypt the payload and the first IP header of the first packet, whereas the second IP header remains unencrypted. In FIG. 1b, this is illustrated as being performed by the VPN-GW 102-1.

The node 102 in the first network domain may then add a third IP header to the encrypted second packet resulting in a third packet. In FIG. 1b, this is illustrated as being performed by the router 102-2. Further, in FIG. 1b, this third packet is illustrated with a payload, the first IP header comprising DSCP, the second IP header comprising DSCP and the third IP header not comprising DSCP. In case the first IP header does not comprise a DSCP when received by the node 102 in the first network domain 100, the node 102 in the first network domain 100 may insert the determined DSCP also into the first IP header. FIG. 1b also illustrates the first IP header and the payload being encrypted, whereas the second and the third IP header are not encrypted. The third IP header comprises a destination address of a node 121 in the second network domain 120. It shall be pointed out that in FIG. 1b, the third IP header could comprise DSCP even if it is illustrated not comprising DSCP in this particular example.

The node 102 in the first network domain 100 may then transmit the third packet in the IP tunnel terminating at the node 121 in the second network domain 120.

Figure 1C:
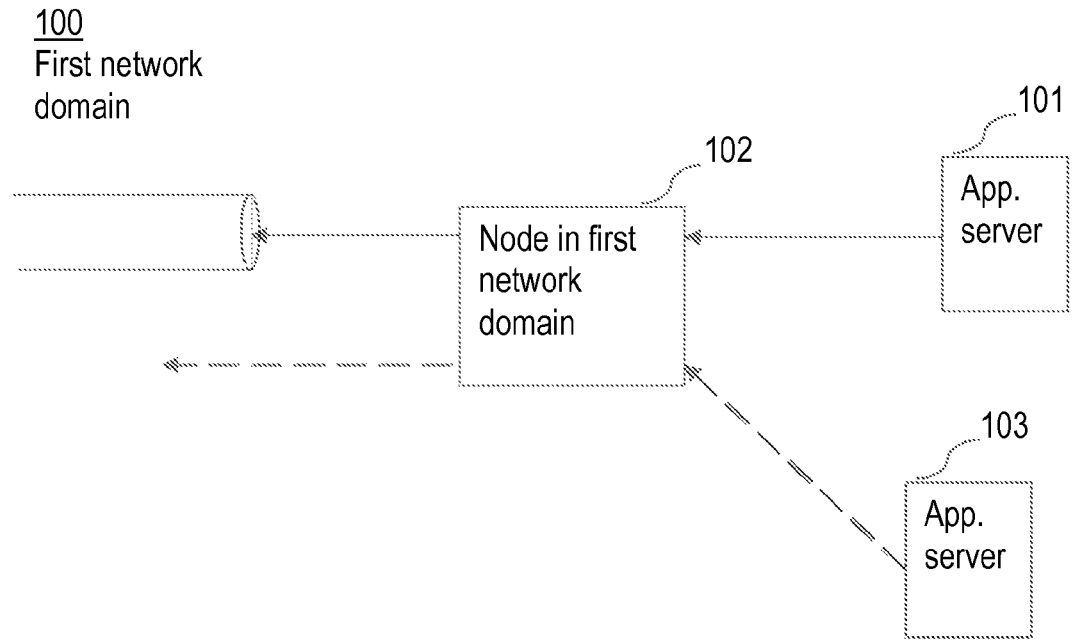
FIG. 1c is a schematic illustration of the node in the first network domain communicating with the node in the second network domain across the third network domain via a VPN according to yet an example.

FIG. 1c is a schematic illustration of the node in the first network domain communicating with the node in the second network domain across the third network domain according to yet an example.

FIG. 1c illustrates the node 102 in the first network domain 100 receiving a packet from a second server 103 not being the application server 101. This is illustrated by the dotted line. The application server 101 is also illustrated sending traffic in the form of data packets to the node 102 in the first network domain 100 which traffic/packets are treated as having been described above in conjunction with FIGS. 1a and 1b.

However, when the node 102 in the first network domain 100 receives the packet from the second server 103, the node 102 in the first network domain 100 determines, based on a predefined criterion, that the packet shall be transmitted towards the second network domain outside the IP tunnel terminating at the node in the second network domain 120 without having the third header added to it. The node 102 in the first network domain 100 transmits the packet outside the IP tunnel terminating at the node in the second network domain. However, the packet may still be encrypted and the second header may be added, but not the third IP header. In other words, the thinner longer elongated tunnel will not be encompassed by the shorter and fatter elongated tunnel which is otherwise the case as illustrated in FIG. 1a.

In other words, the node 102 in the first network domain 100 may comprise different rules, or routing rules, for different application servers and/or for different types of packets.

In an example, the predefined criterion is lack of DSCP in the first IP header, wherein the lack of DSCP in the first header results in the packet being transmitted outside the IP tunnel terminating at the node in the second network domain, regardless of which application server transmitted the packet.

Another example of the predefined criterion is that certain predefined values of DSCP should result in the packet being transmitted outside the IP tunnel terminating at the node 121 in the second network domain 120, wherein other predefined values of DSCP should result in the packet being transmitted inside the IP tunnel terminating at the node 121 in the second network domain 120.

In another example, the criterion is based on which application server is the sender (or source) of the received data packet.

In still an example, in case the node 102 in the first network domain 100 determines that the packet shall be transmitted towards the second network domain outside the IP tunnel terminating at the node in the second network domain 120, the node 102 in the first network domain 100 determines not to determine any DSCP value, wherein the node 102 in the first network domain 100 does not insert a DSCP value in the second IP header of the packet.

Figure 1D:
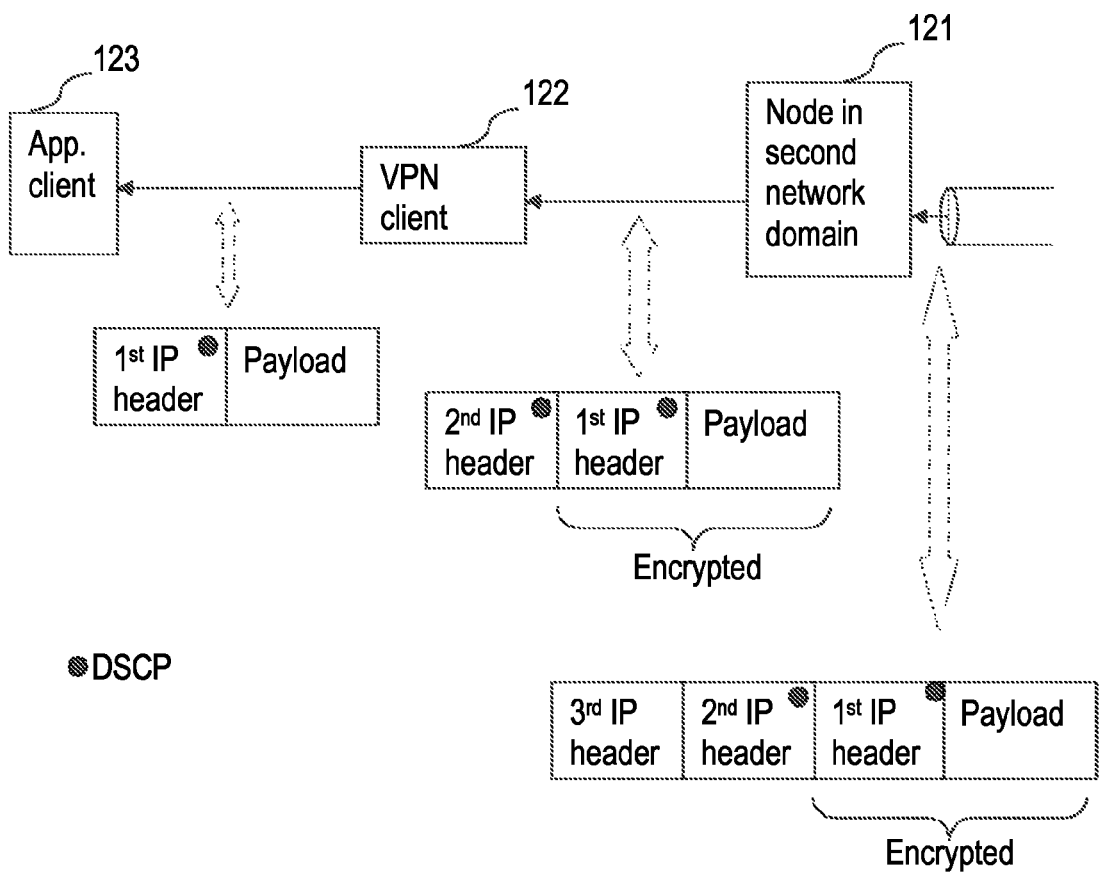
FIG. 1d is a schematic illustration of nodes the second network domain communicating with the node in the first network domain across the third network domain via a VPN according to an example.

FIG. 1d is a schematic illustration of nodes the second network domain 120 communicating with the node in the first network domain across the third network domain according to an example.

FIG. 1d illustrates the node 121 in the second network domain 120 receiving a packet comprising the third IP header, the second and first IP header and the payload, wherein the first IP header and the payload are encrypted. The node 121 in the second network domain 120 removes the third IP header since the node 121 in the second network domain 120 is the destination address comprised in the third IP header. The remaining encrypted packet comprising the unencrypted second IP header (comprising the address of the VPN client 122 and the DSCP), the encrypted first IP header and the encrypted payload is then transmitted, or forwarded, to the VPN client 122 or other node which decrypts the received packet, inspects the DSCP in order to obtain information on how to treat the packet with regard to QoS. For example, the VPN client 122 may obtain information on how to prioritise the further processing of the packet, such as forwarding the packet towards its destination address, i.e. the application client 123. In situations of relatively high load, the VPN client 122 may need, or should, apply different priorities when forwarding/processing the different packets according to the DSCP. Further, any intermediate node, e.g. an access network and/or a Packet Data Network GateWay, may obtain information on how to treat the packet with regard to QoS, e.g. how to prioritise the packet.

The VPN client removes the second IP header before forwarding, or transmitting the packet to the application client 123 whose address is the destination address comprised in the first IP header.

The IP tunnel being the basis for the VPN interconnecting the application server 101 in the first network domain 100 and the application client 123 in the second network domain 120 is illustrated in FIG. 1a as to actually "end" in the VPN client 122 of the second network domain 120. The IP tunnel being the longer horizontal elongated cylinder between the VPN client 122 in the second network 120 and the node 102 in the first network 100. Even though the longer horizontal elongated cylinder between the VPN client 122 in the second network 120 and the node 102 in the first network 100 is schematically illustrated as ending in or at these nodes, the application server and the application client can still be said to be part of the VPN, since they are connected to the node 102 in the first network domain 100 and the VPN client 122 respectively. By means of the VPN, the application server and the application client are enabled to communicate securely and appear to belong to the same communication network. The IP tunnel, i.e. the longer horizontal elongated cylinder between the VPN client 122 in the second network 120 and the node 102 in the first network 100 of FIG. 1a, has one end point in the VPN client 122 meaning that the second IP header which is added to the packet by the node 102 in the first network domain 100 has the destination address being the address of the VPN client 122.

Figure 2A:
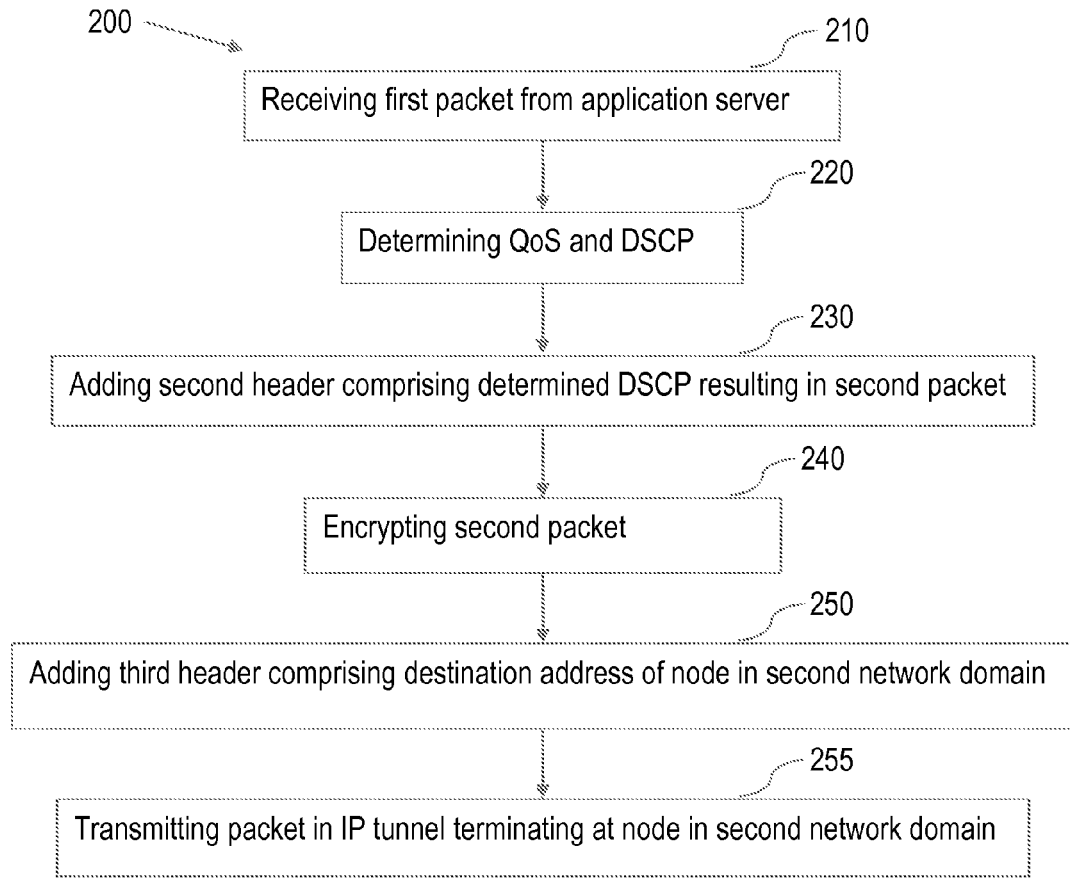
FIG. 2a is a flowchart of a method performed by the node in the first network domain for transmitting a data packet to an application client in the second network domain via a VPN according to an exemplifying embodiment.

FIG. 2a is a flowchart of a method performed by the first node in the first network domain for transmitting a data packet to an application client in the second network domain via an VPN according to an exemplifying embodiment.

FIG. 2a illustrates that the method performed by the node 102 in the first network domain 100 comprises receiving 210, from an application server 101, a first packet comprising a first IP header and a payload; and determining 220 a DCSP. The method further comprises adding 230 a second header comprising the determined DCSP and an IP address of a VPN client 122 resulting in a second packet and encrypting 240 the second packet. Further the method comprises adding 250 a third header to the encrypted second packet resulting in a third packet, wherein the third header comprises a destination address of a node 121 in the second network domain 120, and transmitting 255 the third packet in an IP tunnel terminating at the node 121 in the second network domain 120.

The DSCP may be determined in different ways. In an example, the first IP header may comprise a DSCP and the node 102 in the first network domain 100 may just check if there is a DSCP in the first IP header of the received packet, then the node 102 in the first network domain 100 may copy the DSCP and insert it into a second header. In another example, the first IP header does not comprise a DSCP. Then the node 102 in the first network domain 100 may inspect the packet and determine a QoS and then map the determined QoS to a corresponding DSCP. In still an example, wherein the first IP header does not comprise a DSCP, the node 102 in the first network domain 100 may determine which application server sent the packet and depending on which application server sent the packet, a corresponding DSCP may be determined, i.e. the DSCP is correlated to the application server. Still another example of how to determine the DSCP value is that the node 102 in the first network domain 100 checks the DSCP in the first IP header of the received packet and maps this DSCP value to another DSCP value according to predefined rules. The predefined rules may either be pre-stored in a memory in the node 102 in the first network domain 100 or may be received by the node 102 in the first network domain 100 from a higher level node.

Once the DSCP value is determined, the node 102 in the first network domain 100 adds second header comprising the determined DCSP and the IP address of the VPN client 122 resulting in the second packet. The node 102 in the first network domain 100 then encrypts the second packet. Encrypting the second packet comprises encrypting the payload of the second packet. The payload of the second packet comprises the first/inner IP header and the payload of the first packet. Thus, the second IP header is not encrypted.

Thereafter, the node 102 in the first network domain 100 adds the third header to the encrypted second packet resulting in the third packet, wherein the third header comprises the destination address of the node 121 in the second network domain 120. In this manner, the packet, i.e. the third packet, is ready to be sent towards the receiver (application client) by transmitting the packet to the node 121 in the second network domain 120.

The method performed by the node in the first network domain may have several possible advantages. The method does not impact on the VPN client, thus no updates or modification of the VPN client is required. The method has limited or no impact on the VPN gateway.

The IP tunnel may be one of a GRE, IP-in-IP, and a MPLS tunnel.

There are different protocols and/or techniques that may be used for establishing the IP tunnel. Some examples are the GRE, the IP-in-IP and the MPLS as described above. The GRE is a tunnelling protocol that can encapsulate a wide variety of network layer protocols inside virtual point-to-point links over an Internet Protocol internetwork. The IP-in-IP is an IP tunnelling protocol that encapsulates one IP packet in another IP packet. To encapsulate an IP packet in another IP packet, an outer header is added with source IP Address, i.e. the entry point of the tunnel and the destination IP address, i.e. the exit point of the tunnel. While doing this, the inner packet is unmodified. The MPLS is a scalable, protocol-independent transport. In an MPLS network, data packets are assigned labels. Packet-forwarding decisions are made solely on the contents of this label, without the need to examine the packet itself. This allows one to create end-to-end circuits across any type of transport medium, using any protocol.

The node 102 in the first network domain 100 is in an example a VPN-GW.

As described above with reference to FIG. 1b, the node 102 in the first network domain 100 may be a VPN-GW or it may comprise a VPN-GW.

Figure 2B:
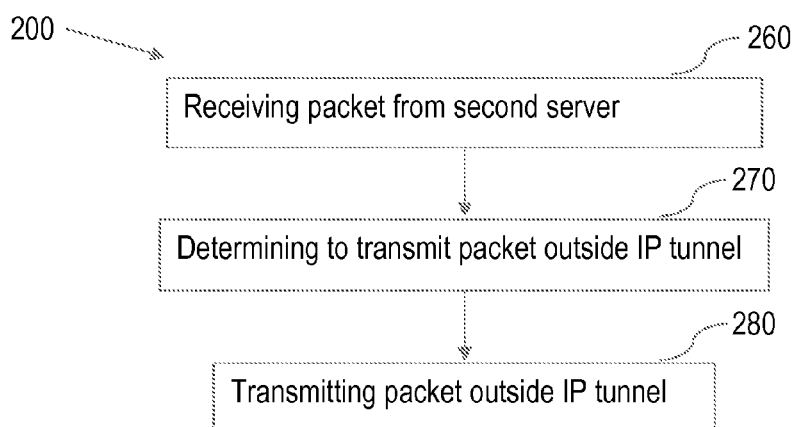
FIG. 2b is a flowchart of a method performed by the node in the first network domain for transmitting a data packet to the second network domain according to an exemplifying embodiment.

The method may further comprise, as illustrated in FIG. 2b, receiving 260 a packet from a second server not being the application server, determining 270, based on a predefined criterion, that the packet shall be transmitted towards the second network domain outside the IP tunnel terminating at the node in the second network domain without having the third header added to it and transmitting 280 the packet outside the IP tunnel terminating at the node in the second network domain.

As described with reference to FIG. 1c, the node 102 in the first network domain 100 may be connected to, or being able to communicate with, other servers than the application server. In FIG. 1c it is illustrated that the node 102 in the first network domain 100 is connected to a first application server 101 and a second application server 103. If packets arrive from the first application server 101 destined for a receiver, those packet may be sent in accordance to the method described above. However, If packets arrive from the second application server 103 destined for a receiver (the same or another receiver as for the first application server 101), those packet may be transmitted outside the IP tunnel terminating at the node in the second network domain. FIG. 1c illustrates merely one example, wherein the predefined criterion is related to which application server the packet(s) is/are received from. There may be a plurality of other criteria, not illustrated in any figures, that may determine that the packet shall be transmitted towards the second network domain outside the IP tunnel terminating at the node in the second network domain without having the third header added to it. For example, the packet can be of a specific type, comprise specific information, be related to specific services wherein such packet is to be transmitted towards the second network domain outside the IP tunnel terminating at the node in the second network domain without having the third header added to it.

In an example, the predefined criterion is lack of DSCP in the first IP header, wherein the lack of DSCP in the first header results in the packet being transmitted outside the IP tunnel terminating at the node in the second network domain.

This is yet an example of a criterion that may cause the node 102 in the first network domain 100 to determine that the packet shall be transmitted towards the second network domain outside the IP tunnel terminating at the node in the second network domain without having the third header added to it.

Determining the DSCP may comprise copying the DSCP from the first IP header.

Also as described above with reference to FIGS. 1a-1d, the first packet received by the node 102 in the first network domain 100 from the application server 101, may or may not comprise the DSCP. In case the DSCP is comprised in the header of the first packet, the node 102 in the first network domain 100 may determine the DSCP to be inserted into the second IP header by copying the DSCP from the first IP header.

Determining the DSCP may be based on the application server from which the node received the first packet.

In the case the first IP header of the first packet does not comprise the DSCP, the node 102 in the first network domain 100 may determine the DSCP based on the application gateway from which the node 102 in the first network domain 100 received the first packet. For example, one or more application servers may be connected to the node 102 in the first network domain 100 by means of a first application gateway and yet another one or more application servers may be connected to the node 102 in the first network domain 100 by means of a second application gateway. Thus, depending on the application gateway, and thus indirectly depending on which application server, from which the node received the first packet, the DSCP may be determined to different values.

In still an example, determining the DSCP comprises determining a QoS associated with the packet or the VPN server and mapping the determined QoS to the DSCP.

The DSCP may inform any router receiver the packet of how to treat the packet. Merely as an example, some DSCP values may indicate that the packet should be prioritised over other packets. Thus, the DSCP has similarities to QoS, such that a packet having high QoS should receive a DSCP value which cause any router receiving the packet to prioritise the packet. Thus, in order to determine a suitable DSCP, the QoS is first determined and then mapped to the suitable DSCP.

Embodiments herein also relate to a node in a first network domain adapted for transmitting a data packet to a VPN client in a second network domain, wherein the node and the VPN client are part of a VPN, wherein the first network domain and second network domain are connected by means of a third network domain. The node has the same technical features, objects and possible advantages as the method performed by the node. The node will hence be described only in brief, with reference to FIG. 3, in order to avoid unnecessary repetition.

Figure 3:
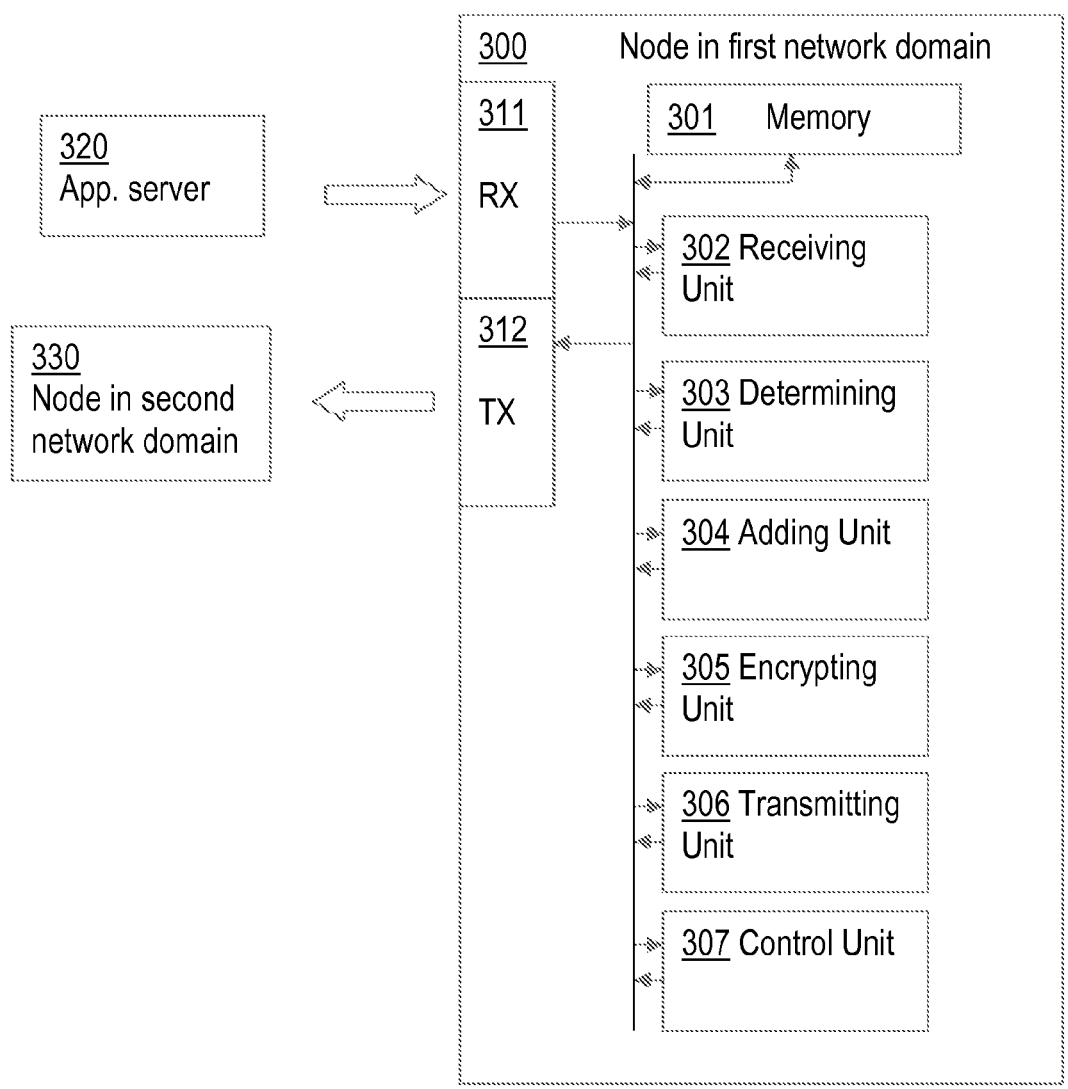
FIG. 3 is a block diagram of the node in the first network domain adapted for transmitting a data packet to an application, client in the second network domain via a VPN according to an exemplifying embodiment.

FIG. 3 illustrates the node 300 comprising a receiving unit 302 adapted for receiving, from an application server 320, a first packet comprising a first IP header and a payload; and a determining unit 303 adapted for determining a DCSP. The node 300 further comprises an adding unit 304 adapted for adding a second header comprising the determined DCSP resulting in a second packet; an encrypting unit 305 adapted for encrypting the packet, wherein the adding unit 304 further is adapted for adding a third header to the encrypted second packet resulting in a third packet. The node 300 further comprises a transmitting unit 306 adapted for transmitting the third packet in an IP tunnel terminating at the node 330 in the second network domain 120.

The node performing the method has the same possible advantages as the method performed by the node. One possible advantage is The method does not impact on the VPN client, thus no updates or modification of the VPN client is required. The method has limited or no impact on the VPN gateway.

According to an embodiment, the IP tunnel is one of GRE, IP-in-IP, and MPLS tunnel.

According to yet an embodiment, the node 300 in the first network domain is a VPN Gateway, VPN-GW.

According to still an embodiment, the receiving unit 302 further is for receiving a packet from a second server not being the application server, wherein the determining unit 303 is for determining, based on a predefined criterion, that the packet shall be transmitted towards the second network domain outside the IP tunnel terminating at the node in the second network domain without having the third header added to it and the transmitting unit 306 is for transmitting the packet outside the IP tunnel terminating at the node 330 in the second network domain.

According to a further embodiment, the predefined criterion is lack of DSCP in the first IP header, wherein the lack of DSCP in the first header results in the transmitting unit 306 transmitting the packet outside the IP tunnel terminating at the node in the second network domain.

According to another embodiment, the determining unit 303 determines the DSCP by copying the DSCP from the first IP header.

According to yet an embodiment, the determining unit 303 determines the DSCP based on the application server from which the node 300 received the first packet.

According to still an embodiment, the determining unit 303 determines the DSCP by determining a QoS associated with the packet or the VPN server and mapping the determined QoS to the DSCP.

In FIG. 3, the node 300 in the first network domain is also illustrated comprising a receiving means 311 and a transmitting means 312. Through these, the node 300 in the first network domain is adapted to communicate with other nodes and/or entities in the first network domain and or other nodes and/or entities in any other network domain. The receiving means 311 may comprise more than one receiving arrangement. For example, the receiving means may be connected to both a wire and an antenna, by means of which the node 300 in the first network domain is enabled to communicate with other nodes and/or entities in the first network domain or in any other network domain. Similarly, the transmitting means 312 may comprise more than one transmitting arrangement, which in turn are connected to both a wire and an antenna, by means of which the node 300 in the first network domain is enabled to communicate with other nodes and/or entities in the first network domain or in any other network domain. The node 300 in the first network domain further comprises a memory 350 for storing data. Further, the node 300 in the first network domain is illustrated comprising a control or processing unit 307 which in turns is connected to the different units 302-306 and the memory 301. It shall be pointed out that this is merely an illustrative example and the node 300 in the first network domain may comprise more, less or other units or modules which execute the functions of the node 300 in the first network domain in the same manner as the units illustrated in FIG. 3.

It should be noted that FIG. 3 merely illustrates various functional units in the node 300 in the first network domain in a logical sense. The functions in practice may be implemented using any suitable software and hardware means/ circuits etc. Thus, the embodiments are generally not limited to the shown structures of the node 300 in the first network domain and the functional units. Hence, the previously described exemplary embodiments may be realised in many ways. For example, one embodiment includes a computer-readable medium having instructions stored thereon that are executable by the control or processing unit 307 for executing the method steps in the node 300 in the first network domain. The instructions executable by the computing system and stored on the computer-readable medium perform the method steps of the node 300 in the first network domain as described above.

Figure 4:
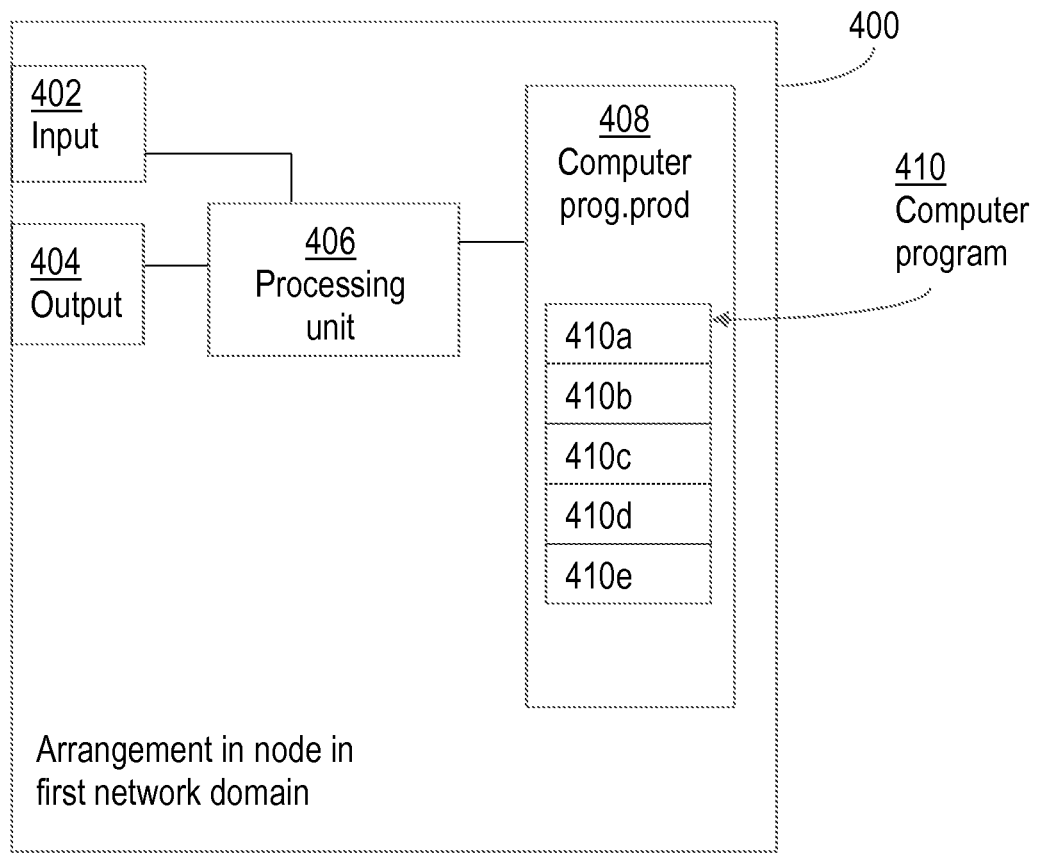
FIG. 4 is a block diagram of an arrangement in the node in the first network domain adapted for transmitting a data packet to an application client in the second network domain via a VPN according to an exemplifying embodiment.

FIG. 4 schematically shows an embodiment of an arrangement 400 in a node in a first network domain. Comprised in the arrangement 400 in the node in the first network domain are here a processing unit 406, e.g. with a DSP (Digital Signal Processor). The processing unit 406 may be a single unit or a plurality of units to perform different actions of procedures described herein. The arrangement 400 in the node in the first network domain may also comprise an input unit 402 for receiving signals from other entities, and an output unit 404 for providing signal(s) to other entities. The input unit and the output unit may be arranged as an integrated entity or as illustrated in the example of FIG. 3, as one or more interfaces 311/312.

Furthermore, the arrangement 400 in the node in the first network domain comprises at least one computer program product 408 in the form of a non-volatile memory, e.g. an EEPROM (Electrically Erasable Programmable Read-Only Memory), a flash memory and a hard drive. The computer program product 408 comprises a computer program 410, which comprises code means, which when executed in the processing unit 406 in the arrangement 400 in the node in the first network domain causes the arrangement 400 in the node in the first network domain to perform the actions e.g. of the procedure described earlier in conjunction with FIGS. 1a-d and FIGS. 2a-b.

The computer program 410 may be configured as a computer program code structured in computer program modules 410a-410e. Hence, in an exemplifying embodiment, the code means in the computer program of the arrangement 400 in the node in the first network domain may comprise a receiving unit, or module, for receiving, from an application server, a first packet comprising a first Internet Protocol, IP, header and a payload. The computer program may further comprise a determining unit, or module, for determining a DCSP. The computer program may further comprise an adding unit, or module, for adding a second header comprising the determined DCSP resulting in a second packet. The computer program may further comprise a, encrypting unit for encrypting the second packet. The adding unit, or module, may further add a third header to the encrypted second packet resulting in a third packet, wherein the third header comprises a destination address of a node in the second network domain. The computer program may further comprise a transmitting unit, or module, for transmitting the third packet in an IP tunnel terminating at the node in the second network domain The computer program modules could essentially perform the actions of the flow illustrated in FIGS. 2a and 2b, to emulate the node 300 in the first network domain of FIG. 3. In other words, when the different computer program modules are executed in the processing unit 406, they may correspond to the units 302-306 of FIG. 3.

Although the code means in the examples disclosed above in conjunction with FIGS. 3 and 4 may be implemented as computer program modules which when executed in the processing unit causes the node in the first network domain to perform the actions described above in the conjunction with figures mentioned above, at least one of the code means may in alternative embodiments be implemented at least partly as hardware circuits.

The processor may be a single CPU (Central processing unit), but could also comprise two or more processing units.

For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the node in the first network domain.

Embodiments herein also relate to a node in a first network domain adapted for transmitting a data packet to a VPN client in a second network domain, wherein the node and the VPN client are part of a VPN, wherein the first network domain and second network domain are connected by means of a third network domain. The node has the same technical features, objects and possible advantages as the method performed by the node. The node will hence be described only in brief, with reference to FIG. 5, in order to avoid unnecessary repetition.

Figure 5:
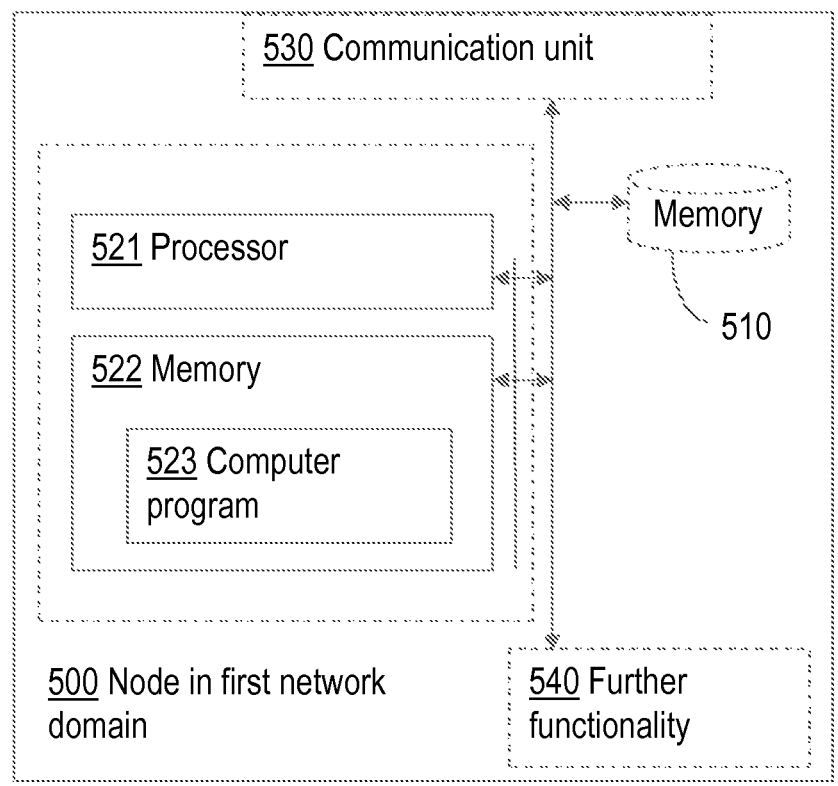
FIG. 5 is a block diagram of the node in the first network domain for transmitting a data packet to an application, client in the second network domain via a VPN according to an exemplifying embodiment.

FIG. 5 illustrates the node 500 comprising a processor 521 and a memory 522, the memory comprising instructions which when executed by the processor 521 causes the node 500 to receive, from an application server, a first packet comprising a first IP header and a payload; to determine a DCSP; and to add a second header comprising the determined DCSP resulting in a second packet. Further, the instructions in the memory when executed by the processor 521 causes the node 500 to encrypt the second packet; to add a third header to the encrypted second packet resulting in a third packet, wherein the third header comprises a destination address of a node in the second network domain; and to transmit the third packet in an IP tunnel terminating at the node in the second network domain.

FIG. 5 also illustrates the node 500 comprising another memory 510. This is not compulsory but optional. The node 500 may comprise different memories for different purposes. E.g. one memory 522 may comprise the computer program and another memory, e.g. 510, may comprise other information such as system information regarding the system in which the node is employed. Still further, FIG. 5 also illustrates the node 500 comprising further functionality 540. This further functionality may be e.g. scheduling means and/or other functionality necessary for the node to operate but that may not be affected by the entities and functionality described herein.

The node performing the method has the same possible advantages as the method performed by the node. One possible advantage is The method does not impact on the VPN client, thus no updates or modification of the VPN client is required. The method has limited or no impact on the VPN server or VPN gateway.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a node in a first network domain for transmitting a data packet to a Virtual Private Network, VPN, client in a second network domain, wherein the node and the VPN client are part of a VPN, wherein the first network domain and second network domain are connected to one another by a third network domain, the method comprising:
receiving, from an application server, a first packet comprising a first Internet Protocol, IP, header and a payload;
determining a Differentiated Service Code Point, DCSP;
adding a second header comprising the determined DCSP to the first packet resulting in a second packet;
encrypting at least the payload of the second packet;
adding a third header to the encrypted second packet resulting in a third packet, wherein the third header comprises a destination address of a node in the second network domain;
transmitting the third packet in an IP tunnel terminating at the node in the second network domain;
receiving a fourth packet from a second server not being the application server;
determining, based on a predefined criterion, that the fourth packet shall be transmitted towards the second network domain outside the IP tunnel terminating at the node in the second network domain without having the third header added to the fourth packet; and,
transmitting the fourth packet outside the IP tunnel terminating at the node in the second network domain.

2. The method according to claim 1, wherein the IP tunnel is one of Generic Routing Encapsulating, GRE, IP-in-IP, Multi Protocol Label Switch, MPLS, tunnel.

3. The method according to claim 1, wherein the node in the first network domain is a VPN Gateway, VPN-GW.

4. The method according to claim 1, wherein the predefined criterion is lack of DSCP in the first IP header, wherein the lack of DSCP in the first header results in the fourth packet being transmitted outside the IP tunnel terminating at the node in the second network domain.

5. The method according to claim 1, wherein determining the DSCP comprises copying the DSCP from the first IP header.

6. The method according to claim 1, wherein determining the DSCP is based on the application server from which the node received the first packet.

7. The method according to claim 1, wherein determining the DSCP comprises determining a Quality-of-Service, QoS associated with the packet or the VPN server and mapping the determined QoS to the DSCP.

8. A node in a first network domain for transmitting a data packet to a Virtual Private Network, VPN, client in a second network domain, wherein the node and the VPN client are part of a VPN, wherein the first network domain and second network domain are connected to one another by a third network domain, the node comprising:
a receive circuit configured to receive, from an application server, a first packet comprising a first Internet Protocol, IP, header and a payload;
a determine circuit configured to determine a Differentiated Service Code Point, DCSP;
an add circuit configured to add a second header comprising the determined DCSP to the first packet resulting in a second packet;
an encrypt circuit configured to encrypt at least the payload of the second packet;
the add circuit is further configured to add a third header to the encrypted second packet resulting in a third packet, wherein the third header comprises a destination address of a node in the second network domain;
a transmit circuit configured to transmit the third packet in an IP tunnel terminating at the node in the second network domain;
the receive circuit is further configured to receive a fourth packet from a second server not being the application server,
the determine circuit is further configured to determine, based on a predefined criterion, that the fourth packet shall be transmitted towards the second network domain outside the IP tunnel terminating at the node in the second network domain without having the third header added to the fourth packet, and
the transmit circuit is further configured to transmit the fourth packet outside the IP tunnel terminating at the node in the second network domain.

9. The node according to claim 8, wherein the IP tunnel is one of Generic Routing Encapsulating, GRE, IP-in-IP, Multi Protocol Label Switch, MPLS, tunnel.

10. The node according to claim 8, wherein the node in the first network domain is a VPN Gateway, VPN-GW.

11. The node according to claim 8, wherein the predefined criterion is lack of DSCP in the first IP header, wherein the lack of DSCP in the first header results in the transmit circuit further configured to transmit the fourth packet outside the IP tunnel terminating at the node in the second network domain.

12. The node according to claim 8, wherein the determine circuit is further configured to determine the DSCP by copying the DSCP from the first IP header.

13. The node according to claim 8, wherein the determine circuit is further configured to determine the DSCP based on the application server from which the node received the first packet.

14. The node according to claim 8, wherein the determine circuit is further configured to determine the DSCP by determining a Quality-of-Service, QoS associated with the packet or the VPN server and mapping the determined QoS to the DSCP.

15. A node in a first network domain adapted for transmitting a data packet to a Virtual Private Network, VPN, client in a second network domain, wherein the node and the VPN client are part of a VPN, wherein the first network domain and second network domain are connected to one another by a third network domain, the node comprising a processor and a memory, the memory comprising instructions which when executed by the processor causes the node to:
receive, from an application server, a first packet comprising a first Internet Protocol, IP, header and a payload;
determine a Differentiated Service Code Point, DCSP;
add a second header comprising the determined DCSP to the first packet resulting in a second packet;

encrypt at least the payload of the second packet;

add a third header to the encrypted second packet resulting in a third packet, wherein the third header comprises a destination address of a node in the second network domain;

transmit the third packet in an IP tunnel terminating at the node in the second network domain;

receive a fourth packet from a second server not being the application server;

determine, based on a predefined criterion, that the fourth packet shall be transmitted towards the second network domain outside the IP tunnel terminating at the node in the second network domain without having the third header added to the fourth packet; and, transmit the fourth packet outside the IP tunnel terminating at the node in the second network domain.

16. A computer-readable medium having stored thereon computer readable code, which when run in a processing unit comprised in an arrangement in a node in a first network domain causes the node to perform a method for transmitting a data packet to a Virtual Private Network, VPN, client in a second network domain, wherein the node in the first domain and the VPN client are part of a VPN, wherein the first network domain and second network domain are connected to one another by a third network domain, the method comprising receiving, from an application server, a first packet comprising a first Internet Protocol, IP, header and a payload;

determining a Differentiated Service Code Point, DCSP;

adding a second header comprising the determined DCSP to the first packet resulting in a second packet;

encrypting at least the payload of the second packet;

adding a third header to the encrypted second packet resulting in a third packet, wherein the third header comprises a destination address of a node in the second network domain;

transmitting the third packet in an IP tunnel terminating at the node in the second network domain;

receiving a fourth packet from a second server not being the application server;

determining, based on a predefined criterion, that the fourth packet shall be transmitted towards the second network domain outside the IP tunnel terminating at the node in the second network domain without having the third header added to the fourth packet; and, transmitting the fourth packet outside the IP tunnel terminating at the node in the second network domain.

* * * * *